United States Patent
Smiley et al.

(10) Patent No.: US 10,389,078 B2
(45) Date of Patent: Aug. 20, 2019

(54) COOLING SYSTEM FOR ROTORCRAFT LASER SYSTEM

(71) Applicant: Sikorsky Aircraft Corporation, Stratford, CT (US)

(72) Inventors: Alfred Russell Smiley, Marlborough, CT (US); Panagiotis Koliais, Milford, CT (US); Timothy Fred Lauder, Oxford, CT (US); Mark R. Alber, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/534,386

(22) PCT Filed: Dec. 10, 2015

(86) PCT No.: PCT/US2015/064969
§ 371 (c)(1),
(2) Date: Jun. 8, 2017

(87) PCT Pub. No.: WO2016/118244
PCT Pub. Date: Jul. 28, 2016

(65) Prior Publication Data
US 2018/0261966 A1 Sep. 13, 2018

Related U.S. Application Data

(60) Provisional application No. 62/106,003, filed on Jan. 21, 2015.

(51) Int. Cl.
*H01S 3/042* (2006.01)
*B64C 27/04* (2006.01)
(Continued)

(52) U.S. Cl.
CPC .............. *H01S 3/042* (2013.01); *B64C 27/00* (2013.01); *B64C 27/04* (2013.01); *B64D 7/06* (2013.01);
(Continued)

(58) Field of Classification Search
CPC .......... H01S 3/04; H01S 3/0407; H01S 3/042; H01S 3/067; H01S 3/06704; B64C 27/04
See application file for complete search history.

(56) References Cited

U.S. PATENT DOCUMENTS 5,692,558 A * 12/1997 Hamilton ................ F28F 13/00
165/104.33
5,974,072 A 10/1999 Hartlove et al.
(Continued)

OTHER PUBLICATIONS

Notification of Transmital of the International Search Report for International Application No. PCT/US2015/064969; International Filing Date: Dec. 10, 2015; dated May 5, 2016; pp. 1-10.
(Continued)

*Primary Examiner* — Armando Rodriguez
(74) *Attorney, Agent, or Firm* — Cantor Colburn LLP

(57) ABSTRACT

A cooling system for a rotorcraft laser system is provided. The cooling system includes at least one laser carrying component operatively coupling a laser turret and a laser generating assembly. The cooling system also includes at least one fuel line fluidly coupled to a fuel tank containing a fuel. The cooling system further includes a heat exchanger containing a portion of the laser carrying component and the fuel line to transfer heat therebetween to cool the laser carrying component.

15 Claims, 3 Drawing Sheets

(51) Int. Cl.
*H01S 3/067* (2006.01)
*B64C 27/00* (2006.01)
*B64D 7/06* (2006.01)
*B64D 37/04* (2006.01)
*H01S 3/04* (2006.01)

(52) U.S. Cl.
CPC .......... *B64D 37/04* (2013.01); *H01S 3/06704* (2013.01); *H01S 3/0407* (2013.01)

(56) References Cited

U.S. PATENT DOCUMENTS

| | | | |
|---|---|---|---|
| 6,575,402 | B1 | 6/2003 | Scott |
| 6,690,696 | B2 | 2/2004 | Byren et al. |
| 6,785,315 | B1 | 8/2004 | Hook et al. |
| 6,960,033 | B1 * | 11/2005 | Acklin .................. G02B 6/4249 372/38.1 |
| 8,654,314 | B2 | 2/2014 | King et al. |
| 2007/0104233 | A1 * | 5/2007 | Vetrovec .................. H01S 3/042 372/35 |
| 2007/0206177 | A1 * | 9/2007 | Anschel .................. F41H 11/02 356/28 |
| 2012/0160958 | A1 | 6/2012 | Stewart |
| 2012/0213513 | A1 * | 8/2012 | Chao ........................ H04K 3/42 398/39 |
| 2012/0248242 | A1 | 10/2012 | Gagne et al. |
| 2014/0218790 | A1 | 8/2014 | Hagen |

OTHER PUBLICATIONS

Written Opinion of the International Searching Authority for International Application No. PCT/US2015/064969; International Filing Date: Dec. 10, 2015; dated May 5, 2016; pp. 1-6.

Invitation to Pay Additional Fees; International Application No. PCT/US2015/064969; International Filing Date: Dec. 10, 2015; dated Feb. 29, 2016; 3 Pages.

* cited by examiner

10,389,078 B2

COOLING SYSTEM FOR ROTORCRAFT LASER SYSTEM

CROSS REFERENCE TO RELATED APPLICATIONS

This application is a National Stage application of PCT/US2015/064969, filed Dec. 10, 2015, which claims the benefit of U.S. Provisional Application No. 62/106,003, filed Jan. 21, 2015, both of which are incorporated by reference in their entirety herein.

BACKGROUND OF THE INVENTION

The embodiments herein generally relate to rotorcraft laser systems and, more particularly, to a cooling system for such laser systems, as well as a method of cooling rotorcraft laser systems.

Fiber lasers are increasingly becoming potent tactical weapons on vehicles. In one example, fiber lasers are employed on an aircraft, such as a helicopter. Use of turreted guns on rotorcraft can be limited by the number of rounds carried on the aircraft, which drives the desire for laser weapons. While implementation of fiber lasers improves on the issue associated with the ammunition storage aspect, challenges with fiber laser systems are present. In particular, some fiber laser systems waste significant energy in the form of heat. This wasted energy can be up to or even above 70% of the total energy. Therefore, waste heat dissipation of a laser system onboard a tactical rotorcraft poses significant challenges and limits the efficient use of such systems on rotorcraft.

BRIEF DESCRIPTION OF THE INVENTION

According to one embodiment, a cooling system for a rotorcraft laser system is provided. The cooling system includes at least one laser carrying component operatively coupling a laser turret and a laser generating assembly. The cooling system also includes at least one fuel line fluidly coupled to a fuel tank containing a fuel. The cooling system further includes a heat exchanger containing a portion of the laser carrying component and the fuel line to transfer heat therebetween to cool the laser carrying component.

In addition to one or more of the features described above, or as an alternative, further embodiments may include that the at least one fuel line extends between the fuel tank and a refueling probe.

In addition to one or more of the features described above, or as an alternative, further embodiments may include a fuel temperature gage operatively coupled to the fuel tank to determine a temperature of the fuel stored therein.

In addition to one or more of the features described above, or as an alternative, further embodiments may include a coolant tank containing a coolant for cooling the laser generating assembly.

In addition to one or more of the features described above, or as an alternative, further embodiments may include a fuel supply line configured to route the fuel from the fuel tank to the coolant tank for cooling of the coolant stored therein and a fuel return line configured to route the fuel back to the fuel tank after cooling of the coolant.

In addition to one or more of the features described above, or as an alternative, further embodiments may include a fuel supply line check valve disposed in the fuel supply line to regulate a flow rate of the fuel and a fuel return line check valve disposed in the fuel return line to regulate a flow rate of the fuel.

In addition to one or more of the features described above, or as an alternative, further embodiments may include that the laser carrying component comprises a fiber cable.

In addition to one or more of the features described above, or as an alternative, further embodiments may include a water tank, a water supply line configured to route water from the water tank to the laser generating assembly, and a water return line configured to route water back to the water tank after cooling the laser generating assembly.

In addition to one or more of the features described above, or as an alternative, further embodiments may include a water temperature gage operatively coupled to the water tank to determine a temperature of the water stored therein and a water volume gage operatively coupled to the water tank to determine a volume of the water.

In addition to one or more of the features described above, or as an alternative, further embodiments may include an exhaust line fluidly coupled to the water tank and configured to expel steam from the water tank and to an engine exhaust.

In addition to one or more of the features described above, or as an alternative, further embodiments may include that the fuel is the primary heat sink for the laser generating assembly, the water being the secondary heat sink for the laser generating assembly.

In addition to one or more of the features described above, or as an alternative, further embodiments may include that the water is the primary heat sink for the laser generating assembly, the fuel being the secondary heat sink for the laser generating assembly.

According to another embodiment, a cooling system for a rotorcraft laser system is provided. The cooling system includes a laser generating assembly. Also included is a liquid tank. Further included is a liquid supply line configured to route liquid from the liquid tank to the laser generating assembly. Yet further included is a liquid return line configured to route liquid back to the liquid tank after cooling the laser generating assembly.

In addition to one or more of the features described above, or as an alternative, further embodiments may include that the liquid tank is a water tank, the liquid supply line is a water supply line configured to route water from the water tank to the laser generating assembly, and the liquid return line is a water return line configured to route water back to the water tank after cooling the laser generating assembly.

In addition to one or more of the features described above, or as an alternative, further embodiments may include an exhaust line fluidly coupled to the water tank and configured to expel steam from the water tank and to an engine exhaust.

According to yet another embodiment, a method of cooling a rotorcraft laser system is provided. The method includes generating a laser with a laser generating assembly. The method also includes routing a laser through a laser carrying component from the laser generating assembly to a laser turret. The method further includes routing water from a water tank to the laser generating assembly for cooling of the laser generating assembly.

In addition to one or more of the features described above, or as an alternative, further embodiments may include refueling a fuel tank with fuel routed from a refueling probe along at least one fuel line to the fuel tank. Also included is transferring heat from the laser carrying component to the fuel in the fuel line.

In addition to one or more of the features described above, or as an alternative, further embodiments may include routing fuel from the fuel tank to the laser generating assembly for cooling of the laser generating assembly.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
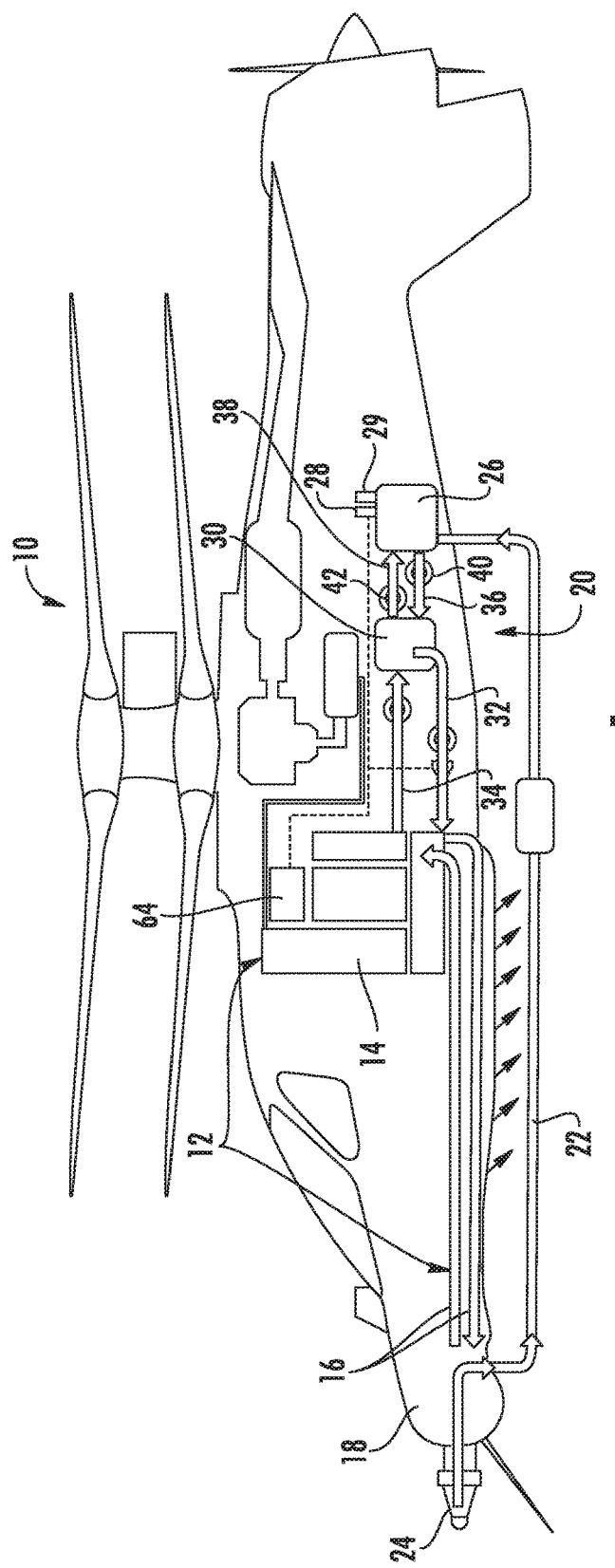
FIG. 1 is a schematic view of a rotary wing aircraft with a laser system according to a first embodiment.

Referring to FIG. 1, illustrated is a rotary wing aircraft 10 having a laser system 12. It is to be understood that the term "helicopter" is a sub-class of the term "rotorcraft," but the terms may be used interchangeably herein. Although a particular helicopter configuration is illustrated and described in the disclosed embodiment, other vehicles with integrated laser systems may also benefit from the embodiments described herein. The laser system 12 facilitates generation of a laser onboard the helicopter 10 and guided control of the laser away from the helicopter 10. The laser system 12 is beneficial in numerous applications, such as tactical weaponry, for example.

The laser system 12 includes a laser generating assembly 14 located onboard the helicopter 10. The location of the laser generating assembly 14 may vary depending upon the particular embodiment of the helicopter 10. The laser generating assembly 14 includes a plurality of components and subassemblies that in conjunction generate a laser. Such components relate to power management, weapons targeting, aircraft integration, fiber laser module(s) and thermal cooling, for example. The preceding list is merely illustrative and not intended to be limiting. Irrespective of the precise components of the laser generating assembly 14, the generated laser is routed along a laser carrying component 16, such as fiber cables piping, to a laser turret 18 for transmission of the laser away from the helicopter 10 to a target. The laser carrying component 16 is operatively coupled to the laser turret 18 and the laser generating assembly 14. It is to be appreciated that a plurality of laser carrying components 16 may be included to provide multiple laser paths, which may lead to a single laser turret or a plurality of laser turrets. As shown in the illustrated embodiment, one carrying component routes the generated laser to the laser turret 18 and one serves as a return line back to the laser generating assembly 14.

The laser system 12 requires cooling during operation to avoid wasted energy in the form of heat dissipation. A cooling system 20 is provided onboard the helicopter 10 to address this issue. As one will appreciate from the description herein, the cooling system 20 advantageously includes fluids that are needed for other onboard operations of the helicopter, such that reliance on coolants that are specifically and solely employed for cooling of the laser system 12 is reduced or avoided.

A fuel line 22 extends between, and is fluidly coupled between, a refueling probe 24 and a fuel tank 26. The fuel line 22 comprises refueling plumbing used for refueling operations that may be performed during flight or on the ground. It is to be appreciated that multiple refueling probes, lines and/or fuel tanks may be included. A portion of the fuel line 22 is positioned to be in proximity to a portion of the laser carrying component(s) 16. The portions of the fuel line 22 and the laser carrying component(s) 16 disposed in proximity to each other exchange heat with one another. In one embodiment, the fuel line 22 and the laser carrying components 16 are enclosed within a structure (not shown). Cooling of the laser carrying components 16 is achieved by formation of the heat exchanger with the fuel line 22. The fuel routed within the fuel line 22 is capable of absorbing a significant amount of heat, while remaining in a condition suitable for its intended use as storage in the fuel tank 26 or for combustion. Instrumentation is provided to monitor one or more characteristics of the fuel. For example, a fuel temperature gage 28 is operatively coupled to the fuel tank 26 to determine a temperature of the fuel stored therein. Additionally, a fuel level gage 29 may also be included to determine the fuel level within the fuel tank 26. Other sensors or gages may be included to determine other fuel conditions.

In addition to cooling of the laser carrying component 16, cooling of the laser generating assembly 14 is desirable and provided by the cooling system 20 described herein. In the embodiment illustrated in FIG. 1, the laser generating assembly 14 is directly or indirectly cooled by the fuel. A coolant tank 30 is provided and configured to contain a coolant therein. In one embodiment, the coolant stored in the coolant tank 30 is actually the fuel and in another embodiment the coolant is a separate coolant. Irrespective of whether the coolant tank 30 stores fuel or a separate coolant, the content is fluidly coupled with the laser generating assembly 14 via a coolant supply line 32 and a coolant return line 34. The coolant from the coolant tank 30 is routed along the laser generating assembly 14 to absorb heat from the assembly to facilitate the overall cooling effort of the laser system 12.

As described above, the coolant routed along the laser generating assembly 14 may be fuel or a separate coolant. In the embodiment of a separate coolant, the coolant is cooled by the fuel to reduce the power required to maintain the coolant at a certain temperature. In such an embodiment, the fuel stored in the fuel tank 26 is routed along a fuel supply line 36 from the fuel tank 26 to a location in close proximity with the coolant tank 30 for cooling of the coolant therein. The fuel is then returned to the fuel tank 26 via a fuel return line 38. The fuel supply line 36 and the fuel return line 38 each include a valve 40, 42, respectively, to regulate a flow rate of the fuel. It is to be appreciated that all fuel lines may include such valves for flow regulation.

In an embodiment where the fuel is actually the coolant stored in the coolant tank 30, the fuel supply line 36 and the fuel return line 38 actually route the fuel into and out of the coolant tank 30 to supply and retrieve fuel.

In the above described embodiments of FIG. 1, fuel is employed as a heat sink for cooling of the laser system 12. Advantageously, the helicopter can be repeatedly refueled, thereby providing a theoretically continuous supply of a coolant that is used to cool the laser system 12.

Figure 2:
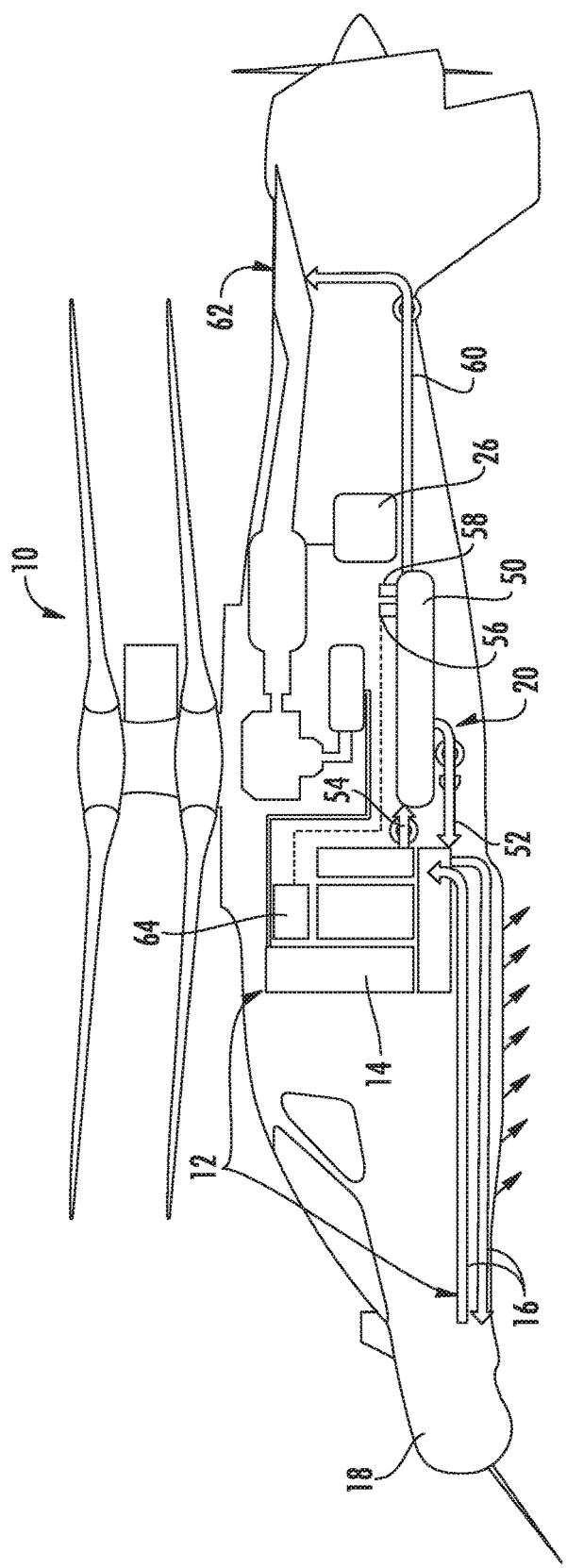
FIG. 2 is a schematic view of a rotary wing aircraft with a laser system according to a second embodiment.

Referring now to FIG. 2, another embodiment of the cooling system 20 is illustrated. In the illustrated embodiment, water is employed as the heat sink to facilitate cooling of the laser system 12. In particular, the cooling system 20 includes a water tank 50 configured to store water therein. It is to be appreciated that more than one water tank may be used to store water for the cooling purposes described herein. A water supply line 52 routes water from the water tank 50 to the laser generating assembly 14 for cooling of the components of the assembly. During passage of the water along the laser generating assembly 14, the water absorbs heat from the assembly to reduce the wasted energy associated with heat dissipation. Subsequent to cooling the laser generating assembly 14, the water is returned to the water tank 50 via a water return line 54.

The conditions of the water must be monitored due to the use of the water as a heat sink. Instrumentation is provided to monitor one or more characteristics of the water. For example, a water temperature gage 56 is operatively coupled to the water tank 50 to determine a temperature of the water stored therein. Additionally, a water volume gage 58 may also be included to determine the water level within the water tank 50. Other sensors or gages may be included to determine other water conditions.

As the water is heated, steam may form depending on the amount of heat absorbed. As the water transitions to steam, the steam is exhausted via an exhaust line 60 fluidly coupling the water tank 50 and an engine exhaust 62. The ability to simply exhaust steam provides an environmentally clean cooling solution and reduces or avoids the need for the use of potentially volatile chemicals.

Figure 3:
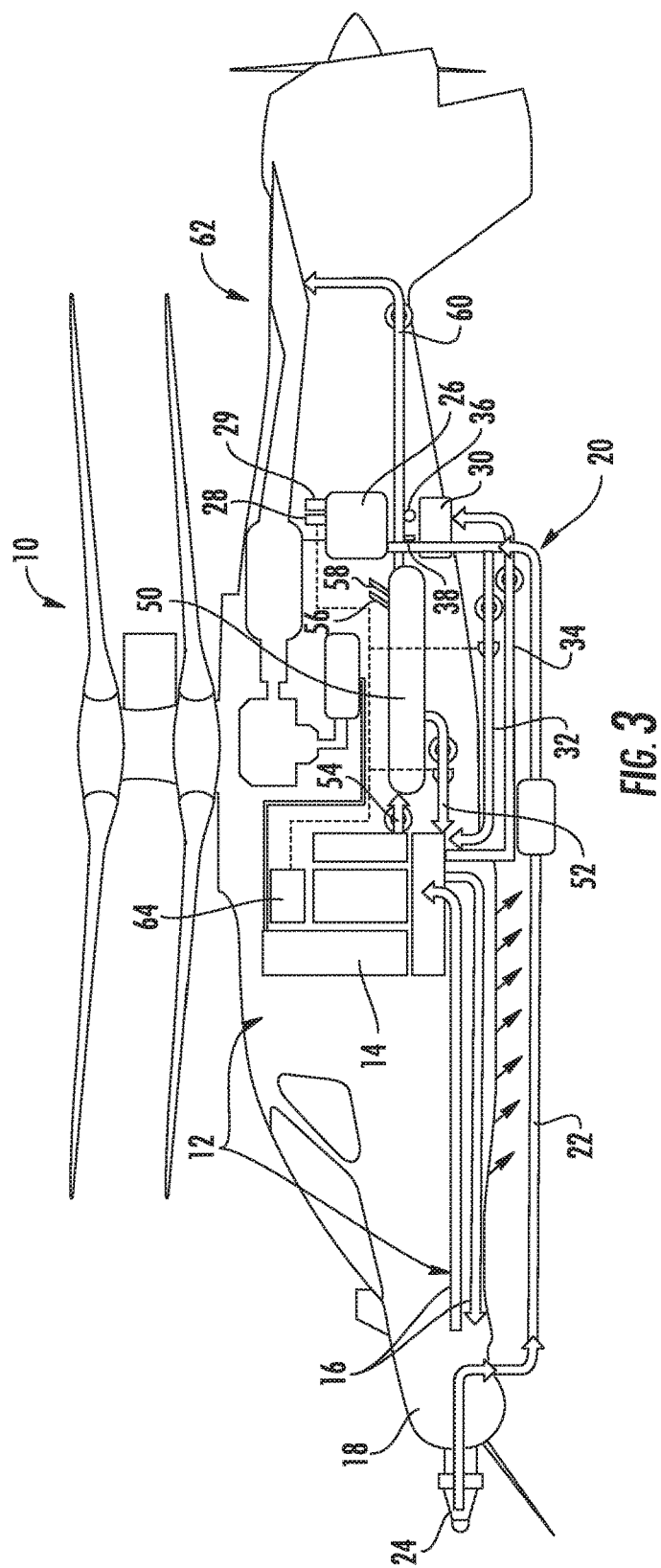
FIG. 3 is a schematic view of a rotary wing aircraft with a laser system according to a third embodiment.

Referring now to FIG. 3, yet another embodiment of the cooling system 20 is illustrated. The cooling system 20 is a hybrid of the embodiments described above. In particular, the fuel and the water that are stored on board in the fuel tank 26 and the water tank 50, respectively, are employed for cooling of the laser system. In other words, a combination of the water-based and fuel-based heat sinks is used to provide cooling of the laser generating assembly 14. Specifically, one subsystem provides routing of the fuel from the fuel tank 26 to the coolant tank 30 and to the laser generating assembly 14 in the manner described in detail above. It is to be understood that the fuel may be used to simply absorb heat from a separate coolant stored in the coolant tank 30 or may be directly used to cool the laser generating assembly 14, as described above. Similarly, the water cooling system described above is also employed.

In the cooling system relying on a combination of fuel and water, it is to be appreciated that the fuel may be used as the primary heat sink for the laser system 12, with the water being used as a secondary heat sink. In such an embodiment, the water is not routed for cooling purposes until a threshold operating condition associated with the fuel occurs. For example, upon detection of a certain fuel temperature or fuel level within the fuel tank 26, the cooling system 20 will transition to use of the water as the heat sink by ceasing flow of the fuel and initiating flow of the water from the water tank 50. Conversely, the water may be used as the primary heat sink for the laser system 12, with the fuel being used as a secondary heat sink. Similar to the scenario described above, the fuel is not routed for cooling purposes until a threshold operating condition associated with the water occurs. Furthermore, it is contemplated that the water and the fuel are employed as a heat sink simultaneously.

Although water and fuel are referred to in the description herein, it is to be understood that any other suitable liquid that is readily available on the rotorcraft may be employed as the heat sink for the laser system 12.

In any of the embodiments described herein, a thermal control unit 64 may be included to monitor various conditions of the overall system. The thermal control unit 64 is in operative communication with a variety of components of the laser system 12 and the cooling system 20. For example, the thermal control unit 64 is in communication with the gages 28, 29 of the fuel tank 26, the gages 56, 58 of the water tank 50, and valves in the fluid supply lines. The thermal control unit 64 is configured to receive a variety of data and determine operations to be executed in response to the received data. This may include closing and opening valves to regulate the water flow and/or fuel flow in response to detected threshold temperatures, pressures and volumes of the fluids within the tanks 26, 30 and 50.

Advantageously, using water and/or fuel as a heat sink for the laser system 12 allows for multiple uses of the fluids that are already needed onboard. Additionally, the use of fuel theoretically offers unlimited cooling due to refueling capabilities of the helicopter 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A cooling system for a rotorcraft laser system comprising:
   at least one laser carrying component operatively coupling a laser turret and a laser generating assembly;
   at least one fuel line fluidly coupled to and extending between a fuel tank containing a fuel and a refueling probe; and
   a heat sink including a portion of the laser carrying component and a portion of the fuel line such that heat is transferred therebetween to cool the laser carrying component.

2. The cooling system of claim 1, further comprising a fuel temperature gage operatively coupled to the fuel tank to determine a temperature of the fuel stored therein.

3. The cooling system of claim 1, further comprising a coolant tank containing a coolant for cooling the laser generating assembly.

4. The cooling system of claim 3, further comprising:
   a fuel supply line configured to route the fuel from the fuel tank to the coolant tank for cooling of the coolant stored therein; and
   a fuel return line configured to route the fuel back to the fuel tank after cooling of the coolant.

5. The cooling system of claim 4, further comprising:
   a fuel supply line check valve disposed in the fuel supply line to regulate a flow rate of the fuel; and
   a fuel return line check valve disposed in the fuel return line to regulate a flow rate of the fuel.

6. The cooling system of claim 1, wherein the laser carrying component comprises a fiber cable.

7. The cooling system of claim 1, further comprising:
   a water tank;
   a water supply line configured to route water from the water tank to the laser generating assembly; and
   a water return line configured to route water back to the water tank after cooling the laser generating assembly.

8. The cooling system of claim 7, further comprising:
a water temperature gage operatively coupled to the water tank to determine a temperature of the water stored therein; and
a water volume gage operatively coupled to the water tank to determine a volume of the water.

9. The cooling system of claim 7, further comprising an exhaust line fluidly coupled to the water tank and configured to expel steam from the water tank and to an engine exhaust.

10. The cooling system of claim 7, wherein the fuel is the primary heat sink for the laser generating assembly, the water being the secondary heat sink for the laser generating assembly.

11. The cooling system of claim 7, wherein the water is the primary heat sink for the laser generating assembly, the fuel being the secondary heat sink for the laser generating assembly.

12. A cooling system for a rotorcraft laser system comprising:
a laser generating assembly;
a liquid tank, wherein the liquid tank is a water tank;
a liquid supply line configured to route liquid from the liquid tank to the laser generating assembly;
a liquid return line configured to route liquid back to the liquid tank after cooling the laser generating assembly; and
an exhaust line fluidly coupled to the water tank and configured to expel steam from the water tank and to an engine exhaust.

13. The cooling system of claim 12, wherein the liquid tank is a water tank, the liquid supply line is a water supply line configured to route water from the water tank to the laser generating assembly, and the liquid return line is a water return line configured to route water back to the water tank after cooling the laser generating assembly.

14. A method of cooling a rotorcraft laser system comprising:
generating a laser beam with a laser generating assembly;
routing the laser beam through a laser carrying component from the laser generating assembly to a laser turret;
routing water from a water tank to the laser generating assembly for cooling of the laser generating assembly; and
routing fuel from a fuel tank to the laser generating assembly for cooling of the laser generating assembly.

15. The method of claim 14, further comprising:
refueling the fuel tank with fuel routed from a refueling probe along at least one fuel line to the fuel tank; and
transferring heat from the laser carrying component to the fuel in the fuel line.

* * * * *